US012331884B2

(12) United States Patent
Gustafson (10) Patent No.: US 12,331,884 B2
(45) Date of Patent: Jun. 17, 2025

(54) CRYOGENIC FLUID COUPLING (71) Applicant: Chart Inc., Ball Ground, GA (US)

(72) Inventor: Erik Gustafson, Woodstock, GA (US)

(73) Assignee: Chart Inc., Ball Ground, GA (US)

( * ) Notice: Subject to any disclaimer, the term of this patent is extended or adjusted under 35 U.S.C. 154(b) by 199 days.

(21) Appl. No.: 17/686,842

(22) Filed: Mar. 4, 2022

(65) Prior Publication Data
US 2022/0282837 A1 Sep. 8, 2022

Related U.S. Application Data (60) Provisional application No. 63/156,438, filed on Mar. 4, 2021.

(51) Int. Cl.
F17C 13/04 (2006.01)
F17C 5/04 (2006.01)

(52) U.S. Cl.
CPC ............. F17C 13/04 (2013.01); F17C 5/04 (2013.01); F17C 2205/0323 (2013.01); F17C 2205/037 (2013.01); F17C 2227/04 (2013.01)

(58) Field of Classification Search
CPC ...... F17C 13/04; F17C 2205/037; F16L 37/36
See application file for complete search history.

(56) References Cited

U.S. PATENT DOCUMENTS

| 4,107,946 A * | 8/1978 | Potter | F17C 13/04 62/50.7 |
| 5,222,520 A * | 6/1993 | Anderson | F16L 55/1015 137/614 |
| 5,301,723 A | 4/1994 | Goode | |
| 6,079,446 A * | 6/2000 | Tocha | F16L 59/141 62/50.7 |
| 2004/0050450 A1 | 3/2004 | Lambert et al. | |

FOREIGN PATENT DOCUMENTS

| CN | 110848562 A | 2/2020 |
| DE | 4339676 A1 | 5/1995 |

OTHER PUBLICATIONS

International Search Report and Written Opinion for International Application PCT/US2022/018879 Dated Jun. 14, 2022.

* cited by examiner

Primary Examiner — Kenneth Rinehart
Assistant Examiner — Nicole Gardner
(74) Attorney, Agent, or Firm — Cook Alex Ltd.

(57) ABSTRACT

A nozzle includes a nozzle bayonet with a warm seal positioned at a distal end and a nose seal positioned at a proximal end so that a distal passage is defined between the warm and nose seals. The nozzle also includes a nozzle poppet valve. Purge and vent lines are in fluid communication with the distal passage. A receptacle includes a receptacle poppet valve, a receptacle inner tube and a receptacle outer tube with a receptacle insulation space defined therebetween. A coupling space is defined between an outer casing and the receptacle outer tube. The receptacle coupling space receives the nozzle bayonet. The receptacle sequentially engages the warm seal and the nose seal of the nozzle during insertion of the nozzle bayonet into the receptacle coupling space with the nozzle and receptacle poppets engaging to open the nozzle and receptacle poppet valves when the nozzle bayonet is fully inserted into the receptacle coupling space.

11 Claims, 7 Drawing Sheets

CRYOGENIC FLUID COUPLING

CLAIM OF PRIORITY

This application claims the benefit of U.S. Provisional Application No. 63/156,438, filed Mar. 4, 2021, the contents of which are hereby incorporated by reference.

FIELD OF THE DISCLOSURE

The present disclosure relates generally to couplings for cryogenic fluids and, more particularly, to quick connect couplings for cryogenic fluids.

BACKGROUND OF THE INVENTION

Vehicles that are fueled by liquid hydrogen (LH2) are growing in popularity because they are environmentally friendly. Given that liquid hydrogen is a cryogenic fluid that boils at approximately −423° F., LH2 must be well-insulated from ambient air during storage and transfer. As a result, a station for refueling an LH2 vehicle requires a quick connect coupling that is also well-insulated from the ambient air. Such a coupling typically features two separate elements: the nozzle (or fuel-station side element) and the receptacle (or vehicle-side element). There are very few known devices that have been developed to refuel vehicles with on-board LH2 storage. Refueling of vehicles powered by liquid natural gas (LNG), on the other hand, is a relatively more commonplace activity. As such, there are several designs of nozzles and receptacles that offer quick connectivity for LNG refueling, but these leave significant room for improvement with regard to LH2 refueling.

An example of a prior art coupling for LH2 refueling is disclosed in European Patent No. EP1472486 B1 to Linde AG and includes a nozzle and receptacle that mate on a flange. Each mating half contains a ball valve which opens after the parts are mated. A "stinger" tube extends from the nozzle (fuel station-side) into the vehicle tank. This is actually a co-axial fill connection that allows hydrogen vapor to return to the station from the vehicle while simultaneously filling liquid hydrogen into the vehicle. Such a coupling, however, is extremely complex with many moving parts.

Bayoneted couplings (also known as "Johnston couplings") are commonly used to connect vacuum jacketed piping. Such couplings use a male piece and a female piece that slip inside each other and maintain a relatively long thermal conduction path from the liquid flowing in the inner pipe to the ambient environment. Typically, bayonets are used for pipe joints in field installations and are essentially permanent after installed.

The need exists for a simple, quick-connect coupling for transferring cryogenic liquid fluids such as liquid hydrogen.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, a coupling for transferring a cryogenic fluid has a nozzle including a nozzle bayonet including a nozzle inner tube and a nozzle outer tube with a bayonet insulation space defined therebetween. A warm seal is positioned at a distal end of the nozzle bayonet while a nose seal positioned at a proximal end of the nozzle inner tube so that a distal passage within the inner tube is defined between the warm seal and the nose seal. A nozzle poppet valve has a nozzle poppet with a nozzle poppet spring urging the nozzle poppet towards a closed position at an outlet of the nozzle poppet valve and an inlet configured to receive the cryogenic fluid. A proximal passage is positioned between the outlet of the nozzle poppet valve and the nose seal. A purge line and a vent line are in fluid communication with the distal passage. A receptacle includes a receptacle inner tube and a receptacle outer tube with a receptacle insulation space defined therebetween. An outer casing surrounds and is annularly spaced from at least a portion of the receptacle outer tube to that a coupling space is defined therebetween. A receptacle poppet valve has a receptacle poppet with a receptacle poppet spring urging the receptacle poppet towards a closed position at an inlet of the receptacle poppet valve and an outlet in fluid communication with the receptacle inner tube. The receptacle coupling space is sized to receive the nozzle bayonet and is configured so that the receptacle sequentially engages the warm seal and the nose seal of the nozzle during insertion of the nozzle bayonet into the receptacle coupling space with the nozzle poppet engaging the receptacle poppet to open the nozzle poppet valve and the receptacle poppet valve when the nozzle bayonet is fully inserted into the receptacle coupling space so that the nozzle and receptacle are in a coupled condition.

In another aspect, a nozzle including a nozzle bayonet including a nozzle inner tube and a nozzle outer tube with a bayonet insulation space defined therebetween. A warm seal is positioned at a distal end of the nozzle bayonet while a nose seal positioned at a proximal end of the nozzle inner tube so that a distal passage within the inner tube is defined between the warm seal and the nose seal. A nozzle poppet valve has a nozzle poppet with a nozzle poppet spring urging the nozzle poppet towards a closed position at an outlet of the nozzle poppet valve and an inlet configured to receive the cryogenic fluid. A proximal passage is positioned between the outlet of the nozzle poppet valve and the nose seal. A purge line and a vent line are in fluid communication with the distal passage.

In yet another aspect, a receptacle includes a receptacle inner tube and a receptacle outer tube with a receptacle insulation space defined therebetween. An outer casing surrounds and is annularly spaced from at least a portion of the receptacle outer tube to that a coupling space is defined therebetween. A receptacle poppet valve has a receptacle poppet with a receptacle poppet spring urging the receptacle poppet towards a closed position at an inlet of the receptacle poppet valve and an outlet in fluid communication with the receptacle inner tube.

In still another aspect, a process for coupling a nozzle and a receptacle includes the steps of providing a nozzle including a warm seal positioned at a distal end of the nozzle and a nose seal positioned at a proximal end of the nozzle so that a distal passage is defined between the warm seal and the nose seal, where the nozzle further includes a nozzle poppet valve, providing a receptacle having a receptacle poppet valve, inserting the nozzle into the receptacle so that the receptacle sequentially engages the warm seal and the nose seal of the nozzle during insertion of the nozzle into the receptacle, purging the distal passage as the nozzle is inserted into the receptacle, venting the distal passage as the nozzle is inserted into the receptacle and engaging the receptacle poppet valve with the nozzle poppet valve to open the nozzle poppet valve and the receptacle poppet valve when the nozzle is fully inserted into the receptacle.

DETAILED DESCRIPTION OF EMBODIMENTS

A vacuum jacketed quick connect coupling is disclosed. While embodiments of the disclosure may be used for refueling vehicles powered by liquid hydrogen (LH2), and are described in terms of such an application, they may find use in transferring alternative cryogenic fluids for other uses.

Figure 1:
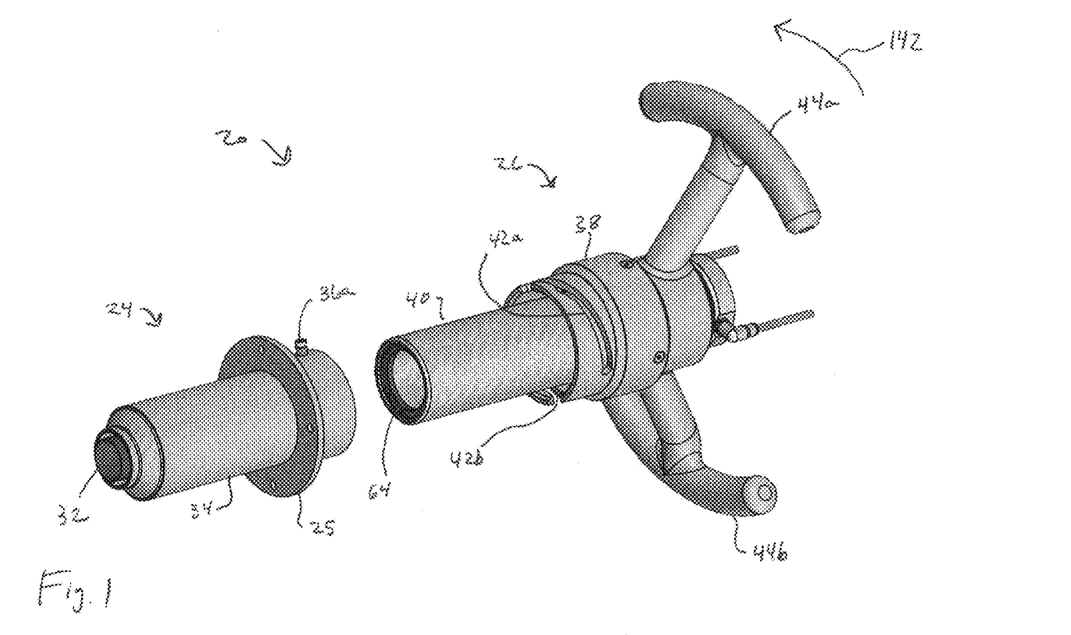
FIG. 1 is a rear perspective view of the receptacle and nozzle in an embodiment of the coupling of the disclosure in a decoupled condition.
Figure 2:
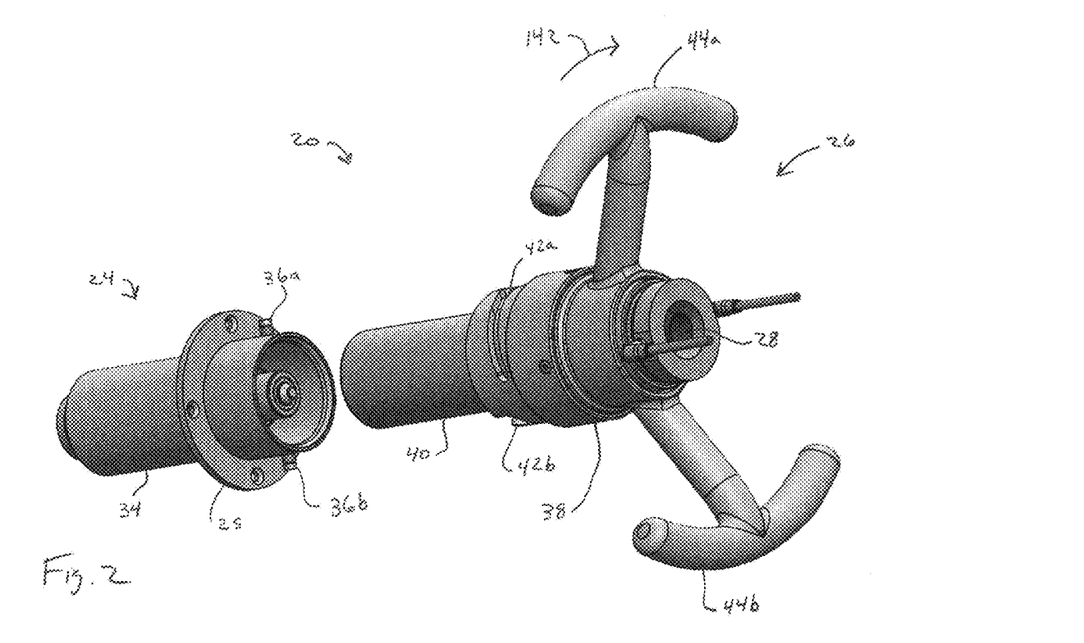
FIG. 2 is front perspective view of the coupling of FIG. 1.

An embodiment of the coupling of the disclosure in the decoupled or unmated condition or state is indicated in general at 20 in FIGS. 1 and 2. The coupling 20 includes a receptacle, indicated in general at 24, and a nozzle, indicated in general at 26. The receptacle 24 may be mounted on a vehicle powered by LH2 via flange 25, while the nozzle 26 may be connected via a connector tube 28 to a fuel delivery hose of a fueling station that receives LH2 from a storage tank or other LH2 source. The receptacle 24 includes a receptacle inner tube 32 which is in fluid communication with a line that leads to the vehicle's on-board LH2 fuel storage tank.

The receptacle includes an outer casing 34 that is provided with a pair of latching pins 36a and 36b.

The nozzle includes a latching collar 38 that rotates with respect to an outer tube 40 of the nozzle. The latching collar features latching grooves 42a and 42b which have openings to receive the latching pins 36a and 36b of the receptacle. As a result, the latching collar of the nozzle and the latching pins 36a and 36b form a latching mechanism. The nozzle also includes a pair of opposing handles 44a and 44b that are mounted to the latching collar which, as explained below, may be manipulated by a user to lock the coupler into a coupled condition or state. While a pair of opposing handles is illustrated for the nozzle, a single handle or an additional number of handles may be alternatively be provided.

Figure 3:
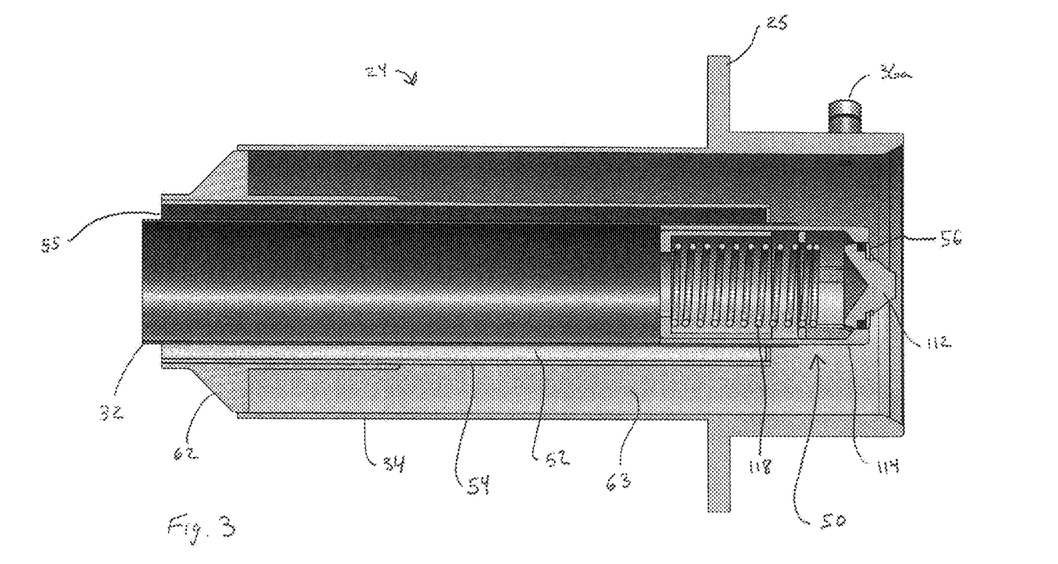
FIG. 3 is a cross-sectional view of the receptacle of FIGS. 1 and 2 with the cutting plane passing through the longitudinal axis.

A cross-section of the receptacle 24 of FIGS. 1 and 2 is provided in FIG. 3. A receptacle poppet valve 50 is positioned within the receptacle. When the poppet valve 50 is open, LH2 passes from the nozzle through the poppet valve and into inner tube 32. The receptacle resembles a bayonet with vacuum insulation or near-vacuum insulation provided in the annular receptacle insulation space 52 between inner tube 32 and an outer tube 54. The open end 55 of the annular space 52 may be closed, as examples only, by a gasket or seal (not shown) or the connection with the line leading to the vehicle on-board fuel tank, which may also be vacuum insulated. A receptacle poppet seal 56 prevents hydrogen egress when the poppet valve 50 is closed. Insulation other than vacuum insulation may alternatively be deployed within the annular insulation space 52. Outer casing 34 is secured to the receptacle by a flanged collar 62, but alternative fastening arrangements may be employed. A cylindrical coupling space 63 is defined between the outer tube 54 and the outer casing 34 of the receptacle.

Figure 4:
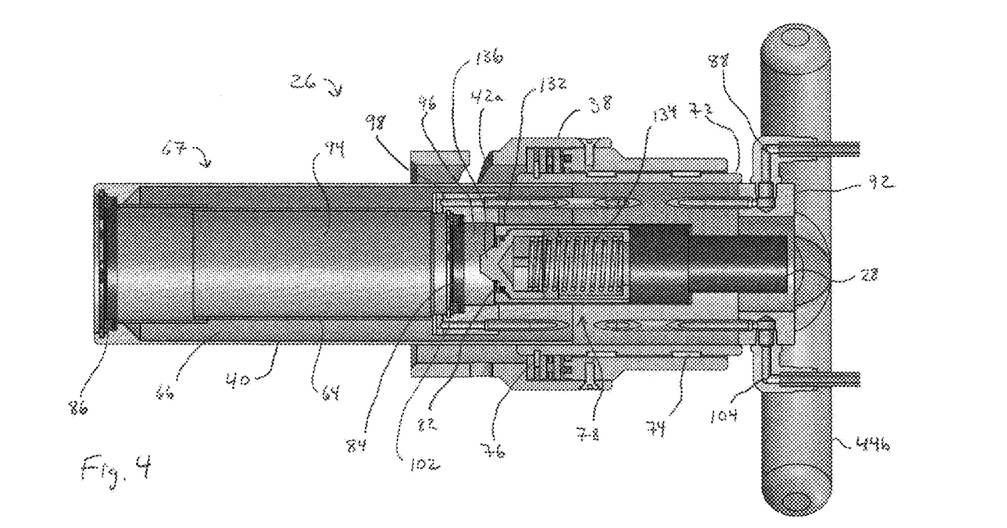
FIG. 4 is a cross-sectional view of the nozzle of FIGS. 1 and 2 with the cutting plane passing through the longitudinal axis.

A cross-section of the nozzle 26 of FIGS. 1 and 2 is shown in FIG. 4. Liquid hydrogen enters the nozzle from the fuel station dispenser from the right through connector tube 28. An inner tube 64 is positioned within the outer tube 40 so that a nozzle bayonet, indicated in general at 67, is formed, and an annular bayonet insulation space 66 is defined. Insulation space 66 is preferably vacuum or near-vacuum insulated, but alternative insulation may be used. The proximal end of the inner tube 64 is secured to a nozzle housing 72 upon which the latching collar 38 is rotatably mounted via bearings 24 and a locking ring 76. Alternative arrangements for rotatably mounting or connecting the latching collar to the nozzle bayonet may be used.

With continued reference to FIG. 4, a nozzle poppet valve, indicated in general at 78, is positioned within the nozzle housing 72 and, when closed, prevents fluid communication between the connector tube 28 and the inner tube 64 via nozzle poppet seal 82. When the nozzle is mated or coupled to the receptacle 24 of FIGS. 1-3, nozzle poppet valve 78 will open and seal 82 will no longer seal.

A nose seal 84 may mate to the housing of the receptacle poppet valve 50 (as shown in later figures). A warm seal 86 acts as a backup hydrogen seal in case of leakage of nose seal 84. A purge line 88, which is connected to the nozzle housing 72 by a purge manifold 92, allows passages 94 and 96 to be purged of air (preferably with helium gas, a pressurized source of which is connected to the purge line 88) via purge passage 98 before the nozzle and receptacle fully mate or couple. This purging is necessitated by the fact that any remaining air in volume 96 could get into the LH2 vehicle tank and later solidify. Solid air is undesirable from a debris standpoint, so its entry into LH2 systems should be minimized.

Vent passage 102 and vent line 104 allow the purge gas to be expelled from the volumes of a distal passage 94 and a proximal passage 96 especially as the nozzle is being mated to the receptacle and warm seal 86 begins engaging. Without this vent pathway, distal passage 94 might be able to build up a slight pressure and make mating the nozzle difficult. Once the nozzle and receptacle are mated, distal passage 94 and proximal passage 96 are distinct across nose seal 84.

In some embodiments, vent passage 102 and vent line 104 may serve an additional function. Valves at the dispenser could close purge line 88 and vent line 104. The pressure could be monitored in the distal passage 94 and/or the purge or vent lines 88 and/or 104 to sense a leak of nose seal 84 as the nose seal degrades from normal usage.

Enlarged views of the receptacle poppet valve 50 are presented in FIGS. 5-8.

Figure 5:
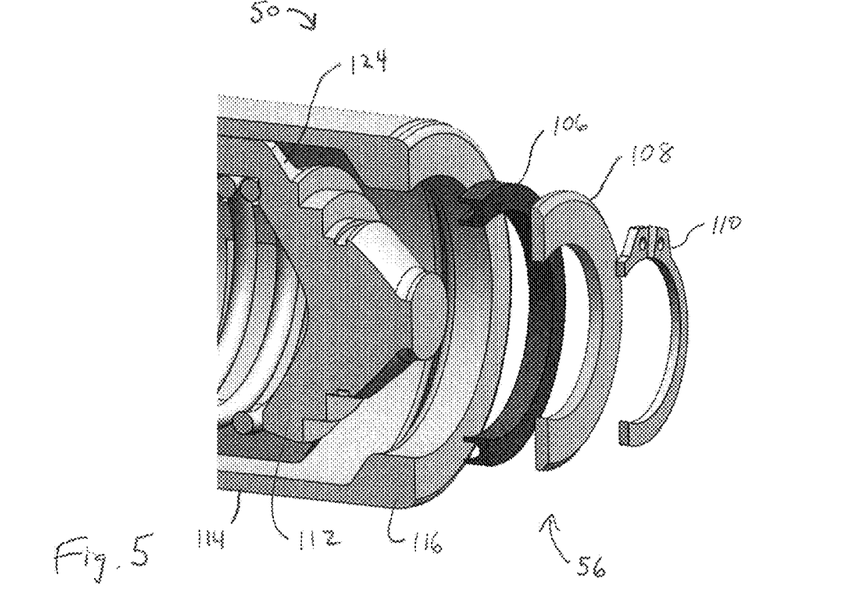
FIG. 5 is partial cross-sectional perspective exploded view of the poppet valve of the receptacle of FIG. 3.
Figure 6:
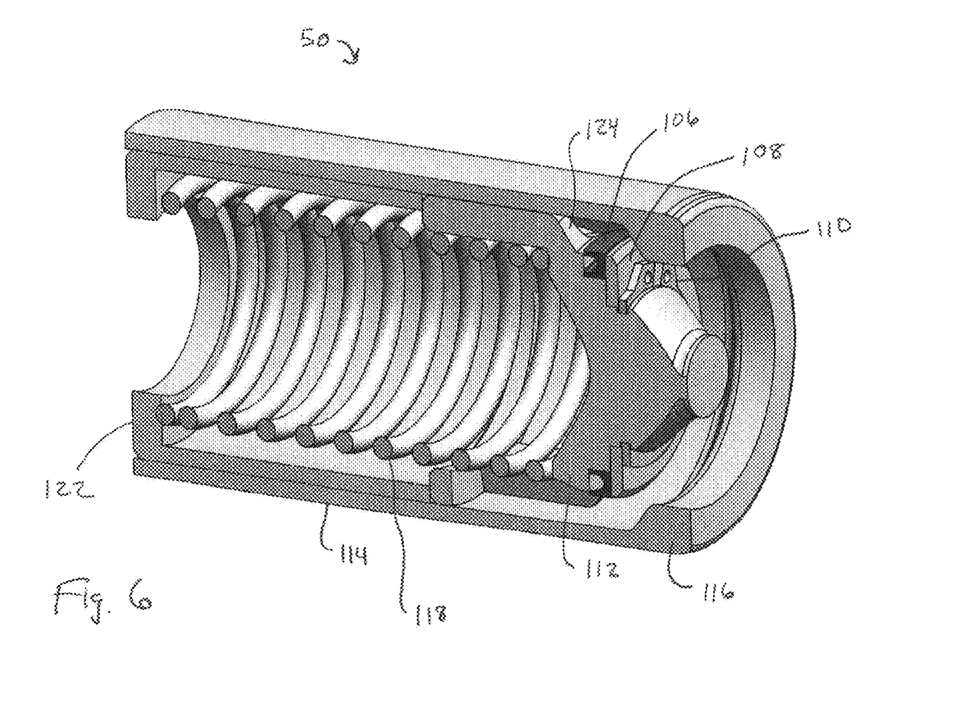
FIG. 6 is a cross-sectional perspective view of the receptacle poppet valve of FIG. 5 in the open state or condition.

As shown in FIGS. 5 and 6, seal 56 includes an inner seal ring 106, an outer seal ring 108 and a locking ring 110. The poppet valve 50 includes a poppet 112 with annular recesses that are configured so as to receive the inner and outer seal rings 106 and 108 as well as the locking ring 110, which holds the inner and outer seal rings in place on the poppet 112 as illustrated in FIGS. 6 and 7.

Figure 7:
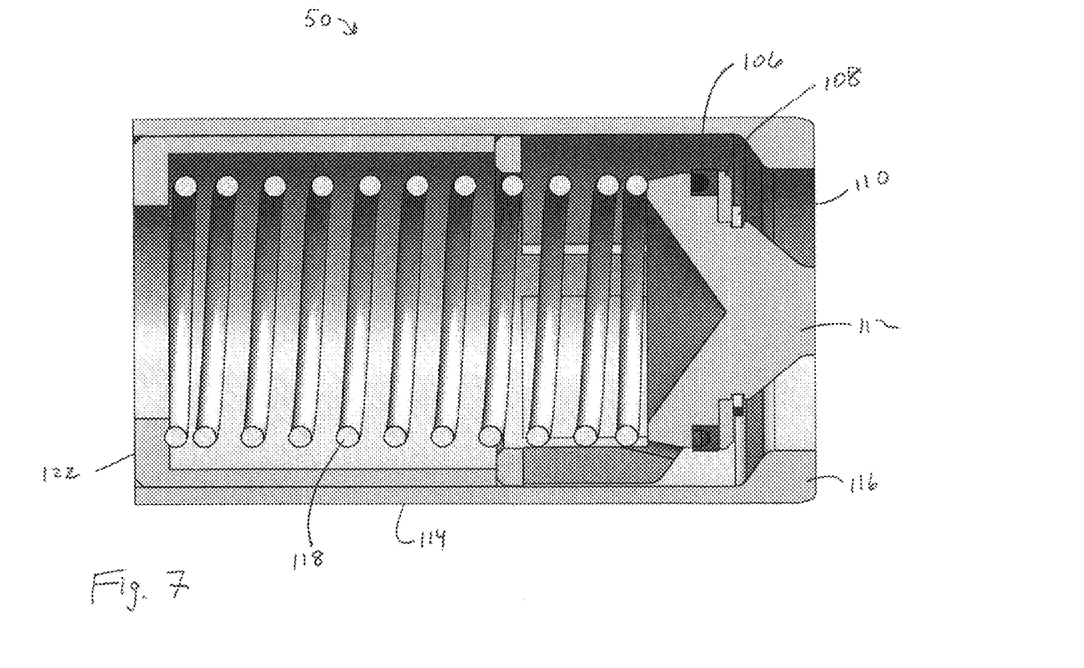
FIG. 7 is a cross-sectional side elevational view of the receptacle poppet valve of FIG. 6.

With reference to FIGS. 6 and 7, the poppet valve 50 features a cylindrical poppet valve housing 114 having an annular lip 116. A coil compression spring 118 engages an insert 122 at an end of the housing opposite the lip 116 and urges the poppet 112 towards the lip 116. The insert 122 may alternatively be integrally formed with the housing. With reference to FIGS. 5 and 6, the poppet 112 is provided with a stop 124. The stop 124 engages the inner surface of the lip 116 of the housing when the poppet valve 50 is in the closed configuration illustrated in FIG. 8. When the poppet 112 is in the position illustrated in FIG. 8, at least the inner seal ring 106 engages the opening 126 (FIGS. 6 and 7) defined by the lip 116 of the housing 114.

Figure 8:
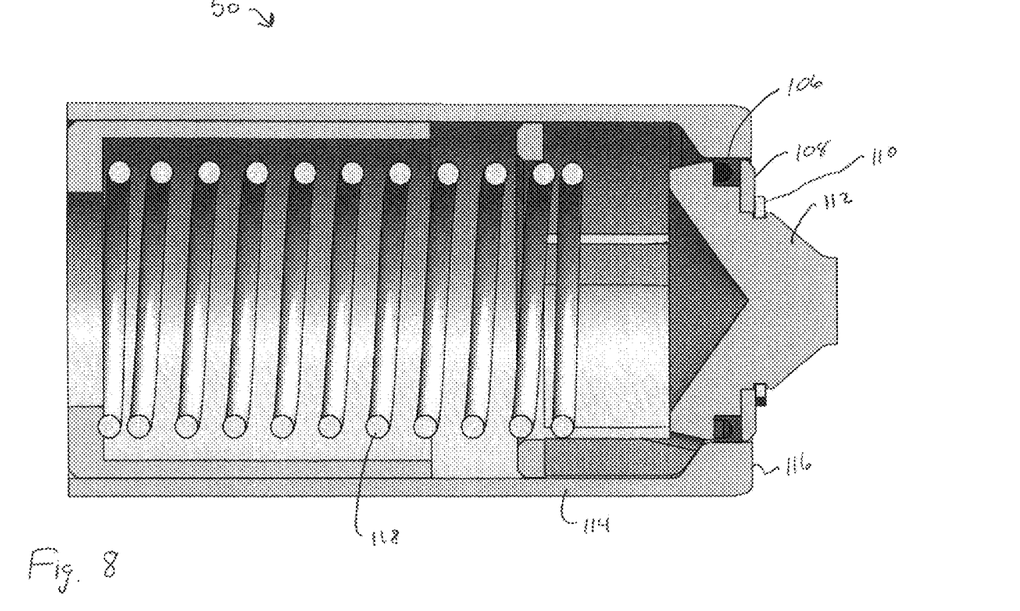
FIG. 8 is a cross-sectional side elevational view of the receptacle poppet valve of FIG. 7 in the closed state or condition.

It should be noted that the coil spring 118 of FIG. 8 is actually in contact with the inner surface of the poppet 112 (as illustrated in FIG. 7) when the poppet is in the position illustrated in FIG. 8. The coil spring 118 is shown as being partially retracted in FIG. 8 for ease of viewing.

The nozzle poppet valve 78 of FIG. 4 works in the same fashion as receptacle poppet 50 and, as illustrated in FIG. 4, includes a cylindrical poppet valve housing 132, a coil compression spring 134 and a poppet 136.

Coupling and latching, and unlatching and decoupling, of the nozzle and receptacle of FIGS. 1-8 will now be described.

Figure 9A:
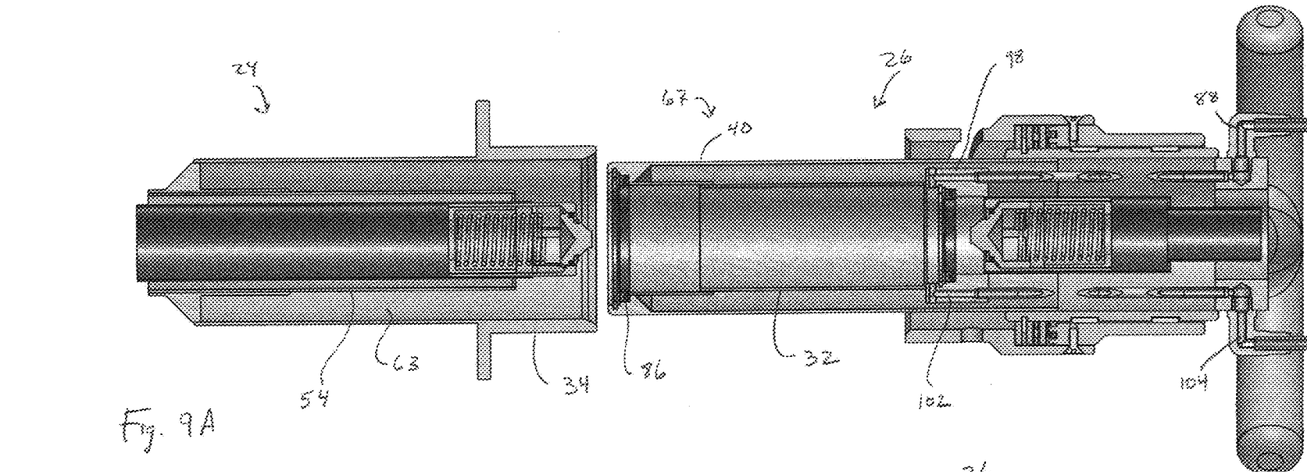
FIG. 9A is a side elevation cross-sectional view of the receptacle and nozzle of the coupling of FIGS. 1 and 2 prior to coupling.
Figure 9B:
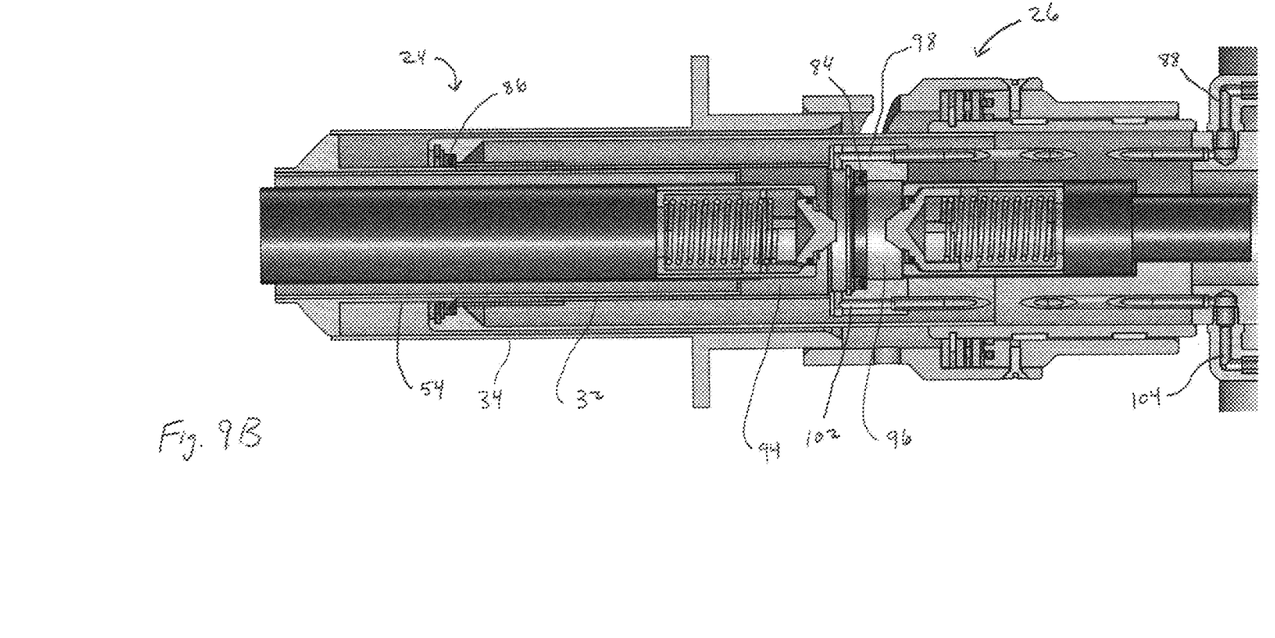
FIG. 9B illustrates the receptacle and nozzle of FIG. 9A during coupling and after the warm seal of the nozzle has been engaged by the receptacle.

With reference to FIGS. 9A and 9B, upon arrival of a vehicle at a fueling station, where receptacle 24 is mounted on the vehicle, a user aligns and inserts the nozzle bayonet 67 into the receptacle coupling space 63 defined between the outer casing 34 and the outer tube 54 of the receptacle.

As described previously, introduction of a pressurized purging gas, such as helium, into the distal and proximal passages 94 and 96 via purge line 88 and purge passage 98 is initiated before the warm seal 86 of the nozzle engages the outer surface of the receptacle outer tube 54. As a result, the passages 94 and 96 are purged of air. The purged air and the purging gas exit from passages 94 and 96 through the vent passage 102 and vent line 104.

As illustrated in FIG. 9B, as the outer tube 40 of the nozzle traverses the coupling space 63 of the receptable, the warm seal 86 of the nozzle engages and slides along the outer surface of outer tube 54 of the receptacle. In addition, the interior surface of the inner tube 32 of the nozzle may be guided by the outer surface of the outer tube 54 of the receptacle.

As the insertion illustrated in FIG. 9B progresses, any purge gas and/or air trapped within the distal and proximal passages 94 and 96 of the nozzle escapes through the vent passage 102 and vent line 104.

Figure 9C:
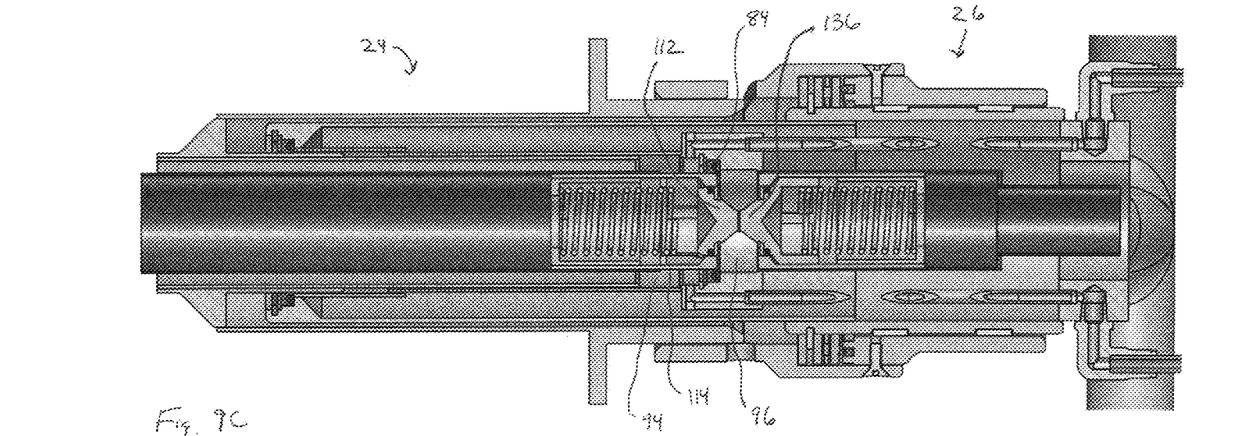
FIG. 9C illustrates the receptacle and nozzle of FIGS. 9A and 9B during coupling and after the nose seal of the nozzle has been engaged by the receptacle.

As illustrated in FIG. 9C, further insertion of the nozzle 26 into the receptacle 24 moves the outer surface of the housing 114 of the receptacle poppet valve into engagement with nose seal 84 so that fluid communication between the proximal and distal passages 96 and 94 is terminated. After (or as) this occurs, the poppet 112 of the receptacle poppet valve abuts and engages the poppet 136 of the nozzle poppet valve. Since the nose seal is engaged, purging of the passages 94 and 96 may be terminated. In an alternative embodiment, the receptacle poppet valve may be positioned more fully within the inner tube 32 of the receptacle so that the exterior surface of the receptacle outer tube 54 engages the nose seal 84 (which would need to have a larger diameter).

Figure 9D:
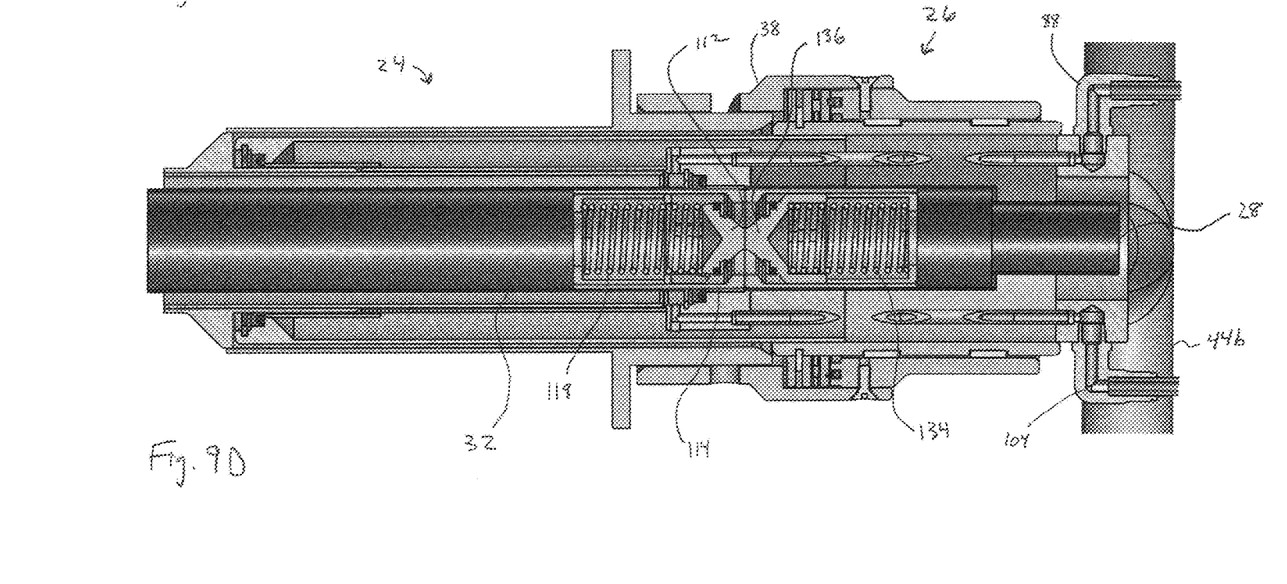
FIG. 9D illustrates the receptacle and nozzle of FIGS. 9A-9C with the nozzle and receptacle fully coupled or mated with the nozzle and receptacle poppet valves in the open state or condition.

As illustrated in FIG. 9D, as the insertion of the nozzle into the receptacle is completed, and as the nozzle is fully inserted into the receptacle, the coil compression spring 118 of the receptacle poppet valve and the coil compression spring 134 of the nozzle poppet valve are compressed by the engaged poppets 112 and 136. As a result, the receptacle poppet valve 50 and the nozzle poppet valve 78 are opened and nozzle connector tube 28 and receptacle inner tube 32 are placed in fluid communication so that LH2 fuel may flow from the nozzle to the receptacle. As noted previously, with the poppets 112 and 136 opened, a leak of the nose seal 84 could be detected by measuring pressure in purge and/or vent lines 88 and 104.

The nozzle and receptacle may be placed and latched into the fully coupled or mated configuration illustrated in FIG. 9D by turning handle 44a and 44b (of FIGS. 1, 2 and 9D). More specifically, with reference to FIGS. 1 and 2, as the nozzle 26 is inserted into the receptacle 24, the latching pins 36a and 36b of the receptacle enter the openings of the latching grooves 42a and 42b of the nozzle latching collar 38. As the nozzle handles 44a and 44b, and thus the latching collar 38) are rotated clockwise (arrow 142 of FIGS. 1 and 2) by the user, the receptacle pins 36a and 36b traverse the inclined latching grooves 42a and 42b so that the nozzle is moved and latched into the position illustrated in FIG. 9D.

Figure 10:
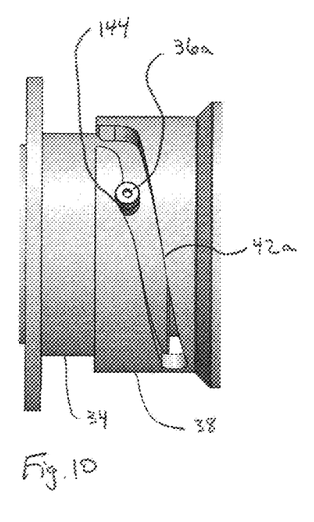
FIG. 10 is an enlarged side elevational view of a portion of the receptacle and a portion of the latching collar of the nozzle with a latching pin of the receptacle positioned within a venting detent of the latching groove of the latching collar.
Figure 11A:
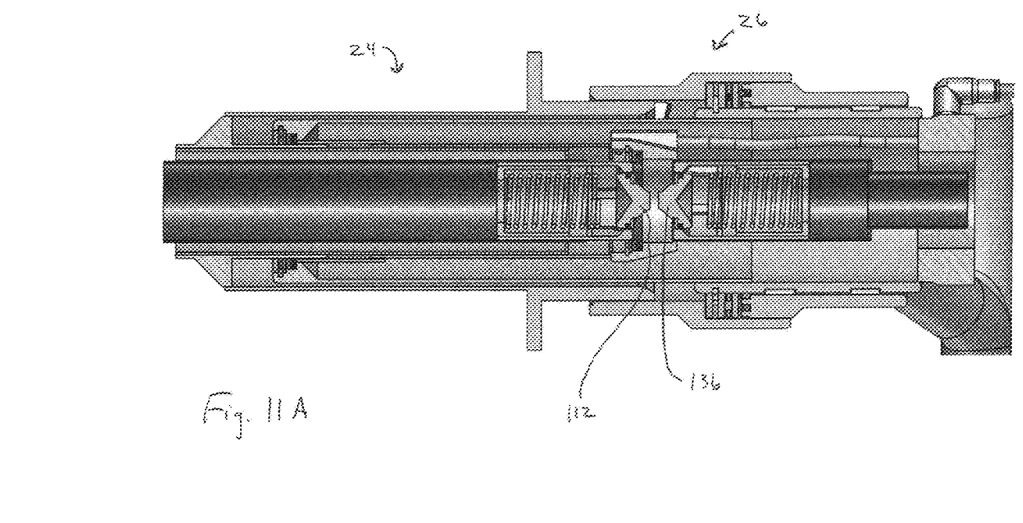
FIG. 11A illustrates the receptacle and nozzle of FIGS. 9A-9D in the venting position.
Figure 11B:
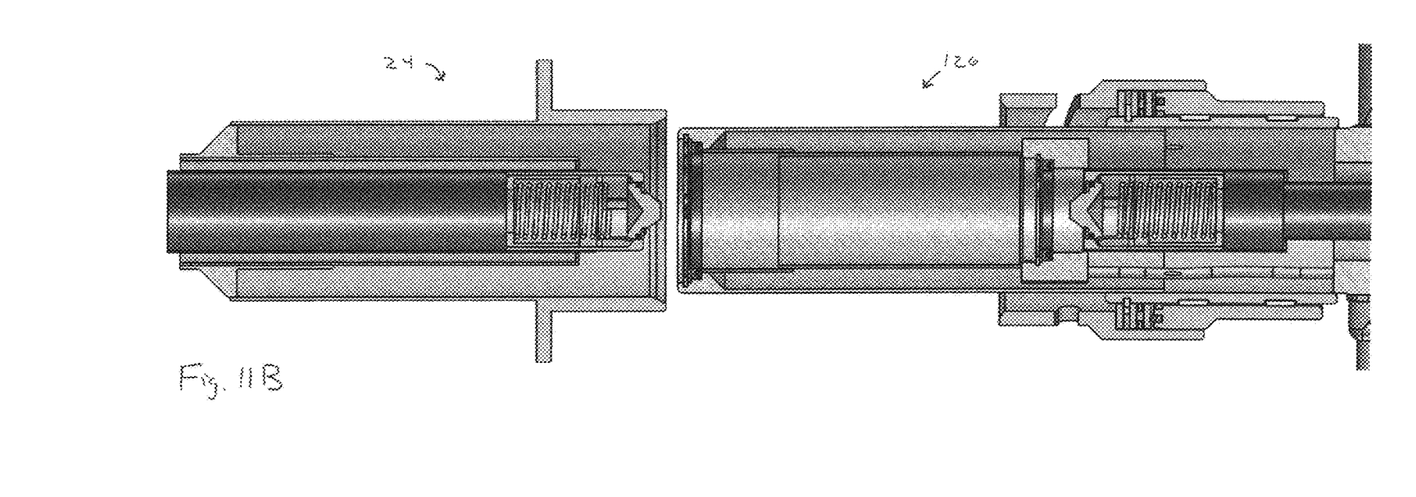
FIG. 11B illustrates the receptacle and nozzle of FIG. 11A after decoupling.

When fueling of the LH2 powered vehicle is completed, the nozzle handles 44a and 44b of FIGS. 1 and 2 are rotated slightly counterclockwise to begin unlatching the nozzle from the receptacle. With reference to FIG. 10, this causes the nozzle latching collar 38 to rotate slightly counterclockwise causing the latching pin 36a of the receptacle to become positioned in a venting detent 144 formed in latching groove 42a of the latching collar. Receptacle latching pin 36b (FIGS. 1 and 2) simultaneously becomes positioned in a similar venting detent formed in latching groove 42b (FIGS. 1 and 2). At this point, the nozzle 26 and receptacle 24 are in the venting condition or positions illustrated in FIG. 11A where the receptacle and nozzle poppets 112 and 136, and thus the corresponding poppet valves, have closed and the nose seal 84 has just disengaged from the exterior surface of the receptacle poppet valve housing 114. As a result, pressure within the passages 94 and 96, that would otherwise push the nozzle away from the receptacle, is released through the vent passage 102 and the vent line 104. Once this pressure is released, the nozzle handles, and thus the latching collar 138, may be rotated further counterclockwise so that the latching pins 136a and 136b (FIGS. 1 and 2) exit the venting detents (144) of the latching grooves 42a and 42b and then travel out of the latching grooves as the nozzle is removed from the receptacle, towards the decoupled state illustrated in FIG. 11B.

In the embodiments described above, the mating of the nozzle and receptacle resemble that of a bayonet but, in addition, poppets are added to the flow path to reduce any venting of hydrogen to the atmosphere. Also, a means to purge the environment that will be trapped between the sealing surfaces during coupling is included. Finally, a means to check for seal leakage during filling can be performed using built-in connections.

While the preferred embodiments of the invention have been shown and described, it will be apparent to those skilled in the art that changes and modifications may be made therein without departing from the spirit of the invention.

What is claimed is:

1. A coupling for transferring a cryogenic fluid comprising:
   a. a nozzle including:
      i) a nozzle bayonet including a nozzle inner tube and a nozzle outer tube with a bayonet insulation space defined therebetween;
      ii) a warm seal positioned at a distal end of the nozzle bayonet, said warm seal having a warm seal engagement surface facing radially inwards;
      iii) a nose seal positioned at a proximal end of the nozzle inner tube so that a distal passage within the inner tube is defined between the warm seal and the nose seal, said nose seal having a nose seal engagement surface facing radially inwards;
      iv) a nozzle poppet valve having a nozzle poppet with a nozzle poppet spring urging the nozzle poppet towards a closed position at an outlet of the nozzle poppet valve and an inlet configured to receive the cryogenic fluid;
      v) a proximal passage positioned between the outlet of the nozzle poppet valve and the nose seal;
      vi) a purge line and a vent line in fluid communication with the distal passage;
      vii) said nozzle bayonet extending downstream of the outlet of the nozzle poppet valve in a direction of fluid flow through the outlet of the nozzle poppet valve when the nozzle poppet is in an open position, said nose seal positioned between the outlet of the nozzle poppet valve and the warm seal;
   b. a receptacle including:
      i) a receptacle inner tube and a receptacle outer tube with a receptacle insulation space defined therebetween;
      ii) an outer casing surrounding and annularly spaced from at least a portion of the receptacle outer tube to that a coupling space is defined therebetween,
      iii) a receptacle poppet valve having a receptacle poppet with a receptacle poppet spring urging the receptacle poppet towards a closed position at an inlet of the receptacle poppet valve and an outlet in fluid communication with the receptacle inner tube;
   c. said receptacle coupling space sized to receive the nozzle bayonet and configured so that the receptacle sequentially engages the warm seal of the nozzle with an outer surface of the outer casing and then the nose seal of the nozzle with an outer surface of the receptacle outer tube during insertion of the nozzle bayonet into the receptacle coupling space with the nozzle poppet engaging the receptacle poppet to open the nozzle poppet valve and the receptacle poppet valve when the nozzle bayonet is fully inserted into the receptacle coupling space so that the nozzle and receptacle are in a coupled condition.

2. The coupling of claim 1 further comprising a latching mechanism configured to latch the nozzle and receptacle in the coupled condition.

3. The coupling of claim 2 wherein the latching mechanism includes a latching pin positioned on the casing of the receptacle and a latching collar rotatably connected to the nozzle bayonet, said latching collar including a latching groove configured to receive the latching pin after the nozzle bayonet has been at least partially inserted into the receptacle coupling space, said latching groove configured to latch the nozzle and receptacle in the coupled condition when the latching collar is rotated.

4. The coupling of claim 3 wherein further comprising a turning handle connected to the latching collar.

5. The coupling of claim 3 further comprising a venting detent formed within the latching groove and configured so that the nozzle and receptacle are secured in a venting condition when the latching pin of the receptacle is positioned within the venting detent, wherein said nozzle poppet valve and said receptacle poppet valve are closed and said receptacle is disengaged from the nose seal when the nozzle and the receptacle are in the venting condition.

6. The coupling of claim 1 wherein the bayonet insulation space and the receptacle insulation space are both vacuum or near-vacuum insulated.

7. A nozzle for a cryogenic fluid coupling comprising:
   a. a nozzle bayonet including a nozzle inner tube and a nozzle outer tube with a bayonet insulation space defined therebetween;
   b. a warm seal positioned at a distal end of the nozzle bayonet, said warm seal having a warm seal engagement surface facing radially inwards;
   c. a nose seal positioned at a proximal end of the nozzle inner tube so that a distal passage within the inner tube is defined between the warm seal and the nose seal, said nose seal having a nose seal engagement surface facing radially inwards;
   d. a nozzle poppet valve having a nozzle poppet with a nozzle poppet spring urging the nozzle poppet towards a closed position at an outlet of the nozzle poppet valve and an inlet configured to receive the cryogenic fluid;
   e. a proximal passage positioned between the outlet of the nozzle poppet valve and the nose seal; and
   f. a purge line and a vent line in fluid communication with the distal passage;
   g. said nozzle bayonet extending downstream of the outlet of the nozzle poppet valve in a direction of fluid flow through the outlet of the nozzle poppet valve when the nozzle poppet is in an open position, said nose seal positioned between the outlet of the nozzle poppet valve and the warm seal.

8. The nozzle of claim 7 wherein the bayonet insulation space is vacuum or near-vacuum insulated.

9. The nozzle of claim 7 further comprising a latching collar rotatably connected to the nozzle bayonet, said latching collar including a latching groove.

10. The nozzle of claim 9 further comprising a turning handle connected to the latching collar.

11. The nozzle of claim 10 further comprising a venting detent formed within the latching groove.

\* \* \* \* \*